(12) United States Patent
Gong et al.

(10) Patent No.: US 7,249,714 B2
(45) Date of Patent: Jul. 31, 2007

(54) METHODS AND APPARATUS FOR A BAR-CODE READER EMPLOYING AN ANTI-FOG COATING

(75) Inventors: Frank Gong, Syosset, NY (US); Mark X. Lamont, Holtsville, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 0 days.

(21) Appl. No.: 11/324,051

(22) Filed: Dec. 29, 2005

(65) Prior Publication Data

US 2007/0152065 A1    Jul. 5, 2007

(51) Int. Cl.
    *G06K 7/10*    (2006.01)
(52) U.S. Cl. .............................. 235/462.43; 235/462.45
(58) Field of Classification Search ........... 235/462.01,
         235/462.07, 462.35, 462.43, 462.46, 462.13,
                                                  235/462.45
    See application file for complete search history.

(56) References Cited

U.S. PATENT DOCUMENTS

| 3,212,909 | A | * | 10/1965 | Leigh ........................ 106/13 |
| 4,478,909 | A | * | 10/1984 | Taniguchi et al. .......... 428/331 |
| 5,508,505 | A | * | 4/1996 | Walts et al. ........... 235/462.46 |
| 5,729,003 | A | * | 3/1998 | Briggs, III ............. 235/462.07 |
| 5,759,696 | A | * | 6/1998 | Alers ........................ 428/431 |
| 5,850,078 | A | * | 12/1998 | Giordano et al. ...... 235/462.27 |
| 6,040,053 | A | * | 3/2000 | Scholz et al. ............... 428/412 |
| 6,177,683 | B1 | * | 1/2001 | Kolesar et al. ............. 250/566 |
| 6,321,990 | B1 | * | 11/2001 | Giordano et al. ...... 235/472.01 |
| 6,667,471 | B2 | * | 12/2003 | Bos et al. ................. 250/208.1 |

\* cited by examiner

*Primary Examiner*—Michael G. Lee
*Assistant Examiner*—Kumiko C. Koyama
(74) *Attorney, Agent, or Firm*—Ingrassia Fisher & Lorenz PC

(57) ABSTRACT

A bar-code reader includes a housing, a window affixed to the housing and separating an internal environment from an external environment, and an anti-fog coating on the window within an optical path of the bar-code reader. In accordance with one embodiment of the present invention, the anti-fog coating is a hydrophilic layer; in another embodiment, it is a hydrophobic layer. The anti-fog coating may be used internally, externally, or both, and may be applied to any number of components within the optical path.

7 Claims, 3 Drawing Sheets

METHODS AND APPARATUS FOR A BAR-CODE READER EMPLOYING AN ANTI-FOG COATING

TECHNICAL FIELD

The present invention relates generally to mobile bar-code readers and, more particularly, to the use of an anti-fog coatings in connection with bar-code readers.

BACKGROUND

Barcode readers and other such portable devices are often moved from one environment to another to facilitate data entry in a variety of locations. For example, it is not uncommon to use a barcode reader in a standard room-temperature environment (e.g., within a commercial shopping space), then use that same barcode reader in a warehouse region or refrigerated area (e.g., a walk-in freezer). Such drastic change of environments is often experienced, for example, in the food service industry.

When a barcode reader is moved from one environment to another, condensation can build up on internal or external surfaces. That is, if the temperature of an optical component drops below the effective dew point of the local environment, small droplets of water can form on the cold surface of that component. When such condensation or "fogging" occurs on optical components, windows, or any part within the optical path, distortion may occur, causing the barcode reader to incorrectly scan barcodes or become largely unusable.

Certain prior art barcode systems incorporate a heated window or a heated holster to prevent condensation. Such systems are costly, take up significant space, and require substantial power. Other prior art systems have incorporated desiccants within the barcode reader housing; however, desiccants are unsatisfactory in that they must be replaced when fully saturated.

Accordingly, it is desirable to provide an efficient barcode reading device that can accommodate changes in environment without significant formation of condensation.

BRIEF SUMMARY

A bar-code reader in accordance with the present invention includes a housing, a window affixed to the housing and separating an internal environment from an external environment, and an anti-fog coating on the window within an optical path of the bar-code reader. In accordance with one embodiment of the present invention, the anti-fog coating is a hydrophilic layer; in another embodiment, it is a hydrophobic layer. The anti-fog coating may be used internally, externally, or both, and may be applied to any number of components within the optical path.

BRIEF DESCRIPTION OF THE DRAWINGS

A more complete understanding of the present invention may be derived by referring to the detailed description and claims when considered in conjunction with the following figures, wherein like reference numbers refer to similar elements throughout the figures.

DETAILED DESCRIPTION

The following detailed description is merely illustrative in nature and is not intended to limit the invention or the application and uses of the invention. Furthermore, there is no intention to be bound by any express or implied theory presented in the preceding technical field, background, brief summary or the following detailed description.

The invention may be described herein in terms of functional and/or logical block components and various processing steps. It should be appreciated that such block components may be realized by any number of hardware, software, and/or firmware components configured to perform the specified functions.

Figure 1:
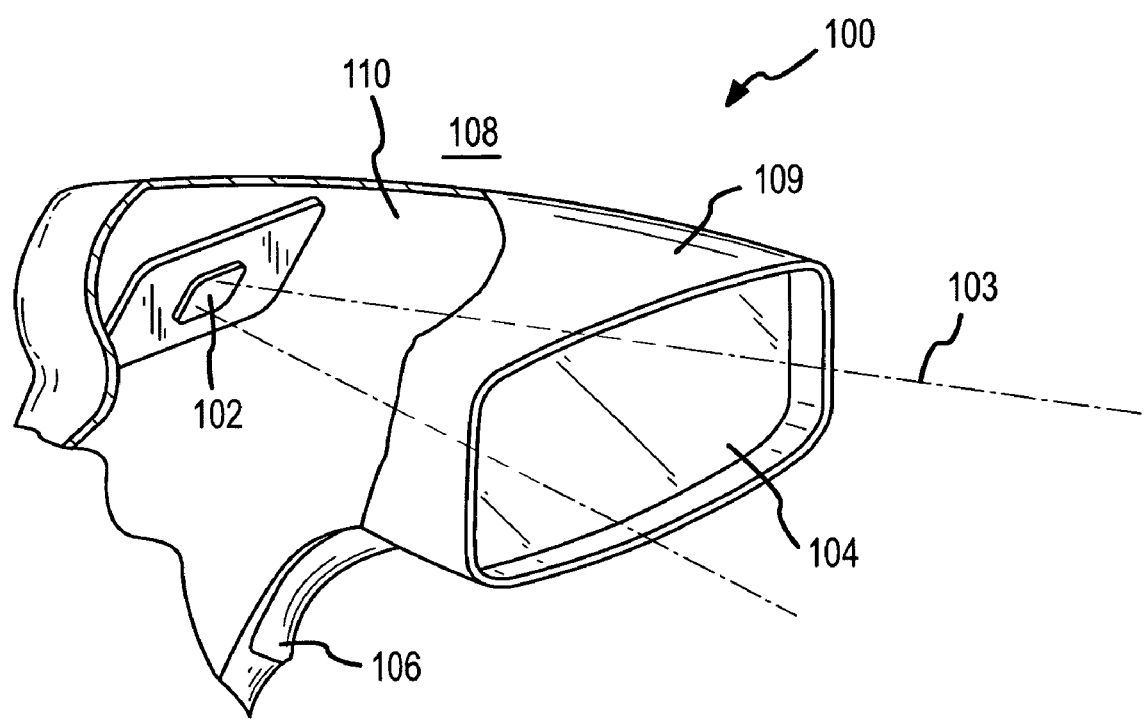
FIG. 1 is a partial cut-away view of an exemplary barcode reader in which systems in accordance with the present invention may be employed.

Referring to FIG. 1, a barcode reader (or "scanner") 100 in accordance with one embodiment of the present invention generally includes a housing 109, at least one internal optical component 102, and a window 104 (e.g., an "exit window") within an optical path 103 of barcode reader 100. Window 104 is at least partially transparent, and is formed from one or more suitable glass or plastic materials. Housing 109 and window 104 alone or in combination with other structural components define an internal environment 110 and an external environment 108.

Reader 100 comprises any suitable scanning or imaging device capable of reading printed indicia and creating an electronic representation (or "data") associated with that image. Such scanners feature, for example, charge coupled device (CCD) image sensors, CMOS imaging devices, laser scanners, etc. Reader 100 includes any number of optical components, such as lasers, mirrors, lenses, and the like. The term "optical path" refers to the entire range of pathways through which light may be transmitted through these components.

Figure 2:
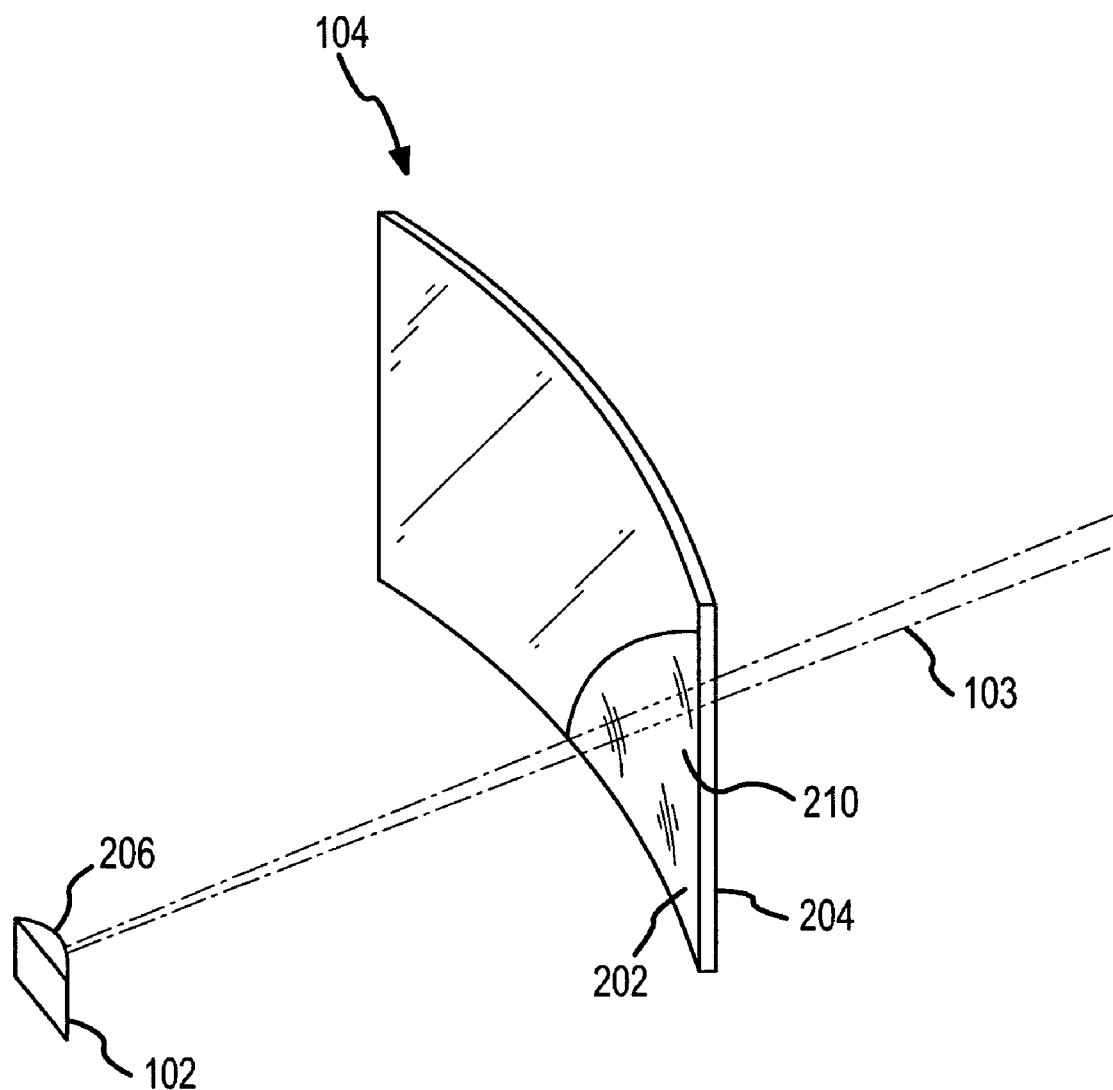
FIG. 2 is a cut-away view of an barcode reader window experiencing condensation.

As mentioned previously, temperature differences between internal environment 110 and external environment 108 can cause undesirable condensation or "fogging" on window 104. More particularly, referring to the simplified component view shown in FIG. 2 (with the housing removed), window 104 separates internal environment 110 from external environment 108. Window 104 has an outer surface 204 exposed to external environment 108, and an inner surface 202 exposed to internal environment 110. Assuming that internal environment 110 contains some level of water vapor (characterized by its relative humidity), if the temperature of window 104 reaches or drops below a threshold temperature (generally, its "dew point") then small droplets of water will form on surface 202 of window 104 (e.g., within condensation region 210). Light (or any another form of electromagnetic radiation) traveling from or to optical component 102 through window 104 can be undesirably disrupted by condensation 210 present within the optical path of the barcode reader.

Figure 3:
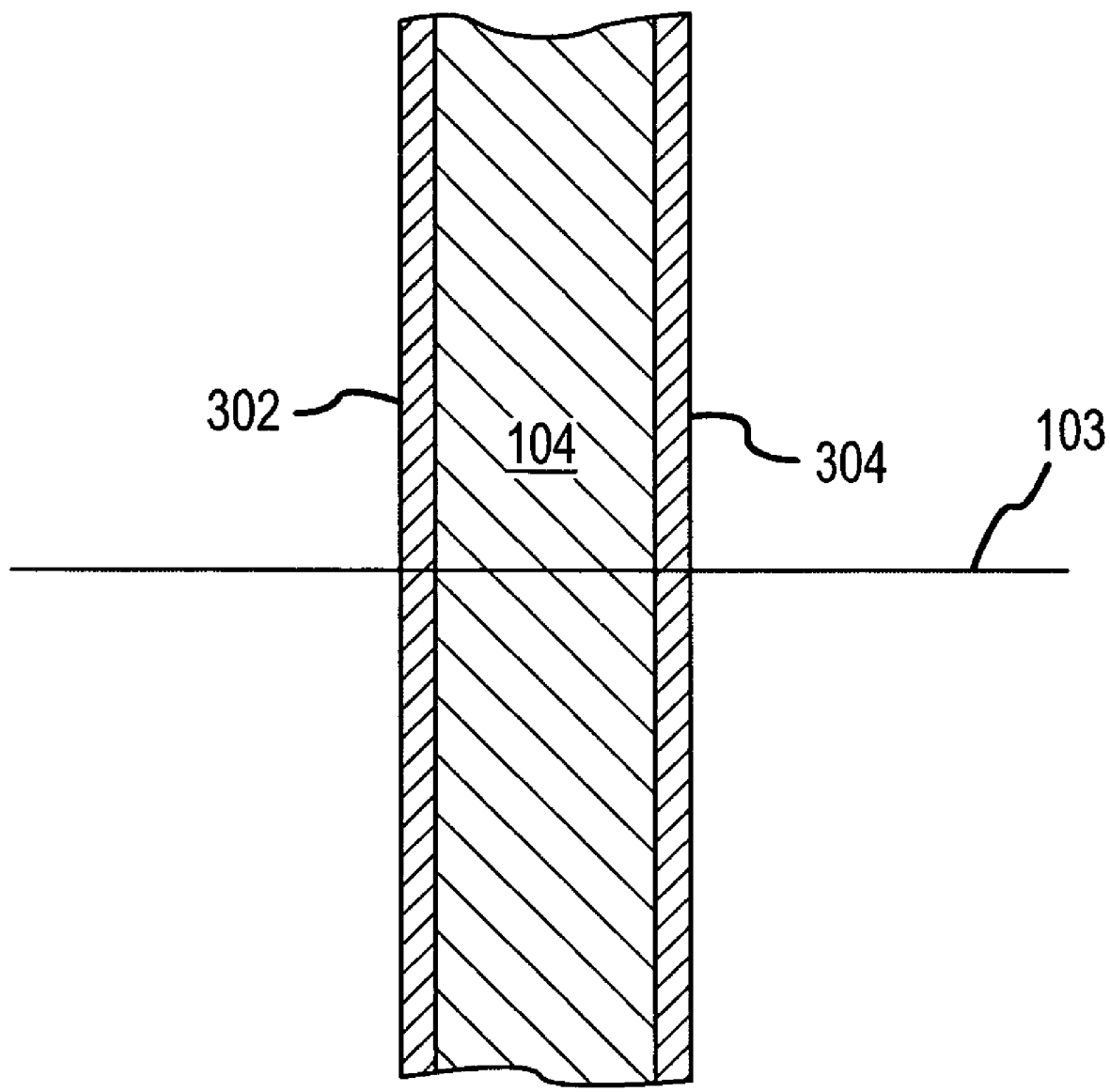
FIG. 3 is a cross-sectional view of a barcode window in accordance with one embodiment of the present invention.

In accordance with the present invention, a suitable anti-fog coating is formed, applied, deposited, or otherwise provided on window 104 (and/or other components within the optical path) to prevent or reduce the deleterious effects of condensation. More particularly, referring to the exemplary cross-section shown in FIG. 3, a window 104 within optical path 103 includes an anti-fog coating 302 exposed to internal environment 110 and/or an anti-fog coating 304 exposed to external environment 108. It will be appreciated that the term "coating" is not meant to limit the nature of the anti-fog material or the manner in which it is formed.

Anti-fog coating 302, 304 may be formed using any method now known or later developed, depending upon the type of anti-fog coating employed and the composition and surface characteristics of window 104. Thus, coating 302 may be an applied film, a deposited coating, or any other such layer. In one embodiment, a large sheet of glass or plastic with a pre-formed anti-fog layer is provided, and that sheet is cut into segments that can be used for the window or other component.

In this regard, there are two general types of anti-fog coatings: hydrophilic coatings and hydrophobic coatings. Hydrophilic coatings interact with the condensation such that the condensed water forms a relatively thin layer of uniform thickness rather than a large number of individual water droplets. Hydrophobic coatings, however, include water-repelling molecules, thereby causing the water droplets to join and flow across the surface under the influence of gravity (or some other force of acceleration).

Hydrophilic anti-fog coatings include, for example, colloidal silica, titanium oxide, alkyl ammonium carboxylates, salts of sulfated alkyl aryloxypolyalkoxy alcohol, and alkylbenzene sulfonates. Example hydrophobic coatings include polymeric aliphatic or aromatic hydrocarbons, fluorocarbons, silicones, hydrophobic polyethers, and hydrophobic polyesters.

It should be understood that while the illustrated embodiment shows an anti-fog coating on an exit window, the present invention is not so limited. The anti-fog coating may be placed on any surface within the optical path (e.g., surface 206 of optical component 102, shown in FIG. 2).

While at least one example embodiment has been presented in the foregoing detailed description, it should be appreciated that a vast number of variations exist. It should also be appreciated that the example embodiment or embodiments described herein are not intended to limit the scope, applicability, or configuration of the invention in any way. Rather, the foregoing detailed description will provide those skilled in the art with a convenient road map for implementing the described embodiment or embodiments. It should be understood that various changes can be made in the function and arrangement of elements without departing from the scope of the invention as set forth in the appended claims and the legal equivalents thereof.

What is claimed is:

1. A bar-code reader comprising:
    a portable scanner housing configured to be hand-held;
    an at least partially transparent window affixed to said housing and separating an internal housing environment from an external environment, wherein said window is within an optical path of the bar-code reader, said window having an internal surface adjacent said internal housing environment and an external surface adjacent said external environment;
    an internal scanning device within the internal housing environment and the optical path; and
    a substantially uniform non-heat-generating anti-fog coating layer provided on said internal scanning device, said external surface, and said internal surface of said window.

2. The bar-code reader of claim 1, said anti-fog coating layer being a hydrophobic anti-fog coating layer.

3. The bar code reader of claim 2, wherein the hydrophilic anti-fog coatings layer includes one or more of the following: colloidal silica, alkyl ammonium carboxylates, salts of sulfated alkyl aryloxypolyalkoxy alcohol, and alkylbenzene sulfonates.

4. The bar-code reader of claim 1, said anti-fog coating layer being a hydrophilic anti-fog coating layer.

5. The bar code reader of claim 4, wherein the hydrophobic anti-fog coating layer includes one or more of the following: polymeric aliphatic, aromatic hydrocarbons, fluorocarbons, silicones, hydrophobic polyethers, and hydrophobic polyesters.

6. The bar-code reader of claim 1, wherein said window comprises a material selected from the group consisting of plastic and glass.

7. The bar-code reader of claim 1, wherein the substantially uniform anti-fog coating layer is substantially uniform across an entire length and width of the at least partially transparent window.

* * * * *